Figure 2:
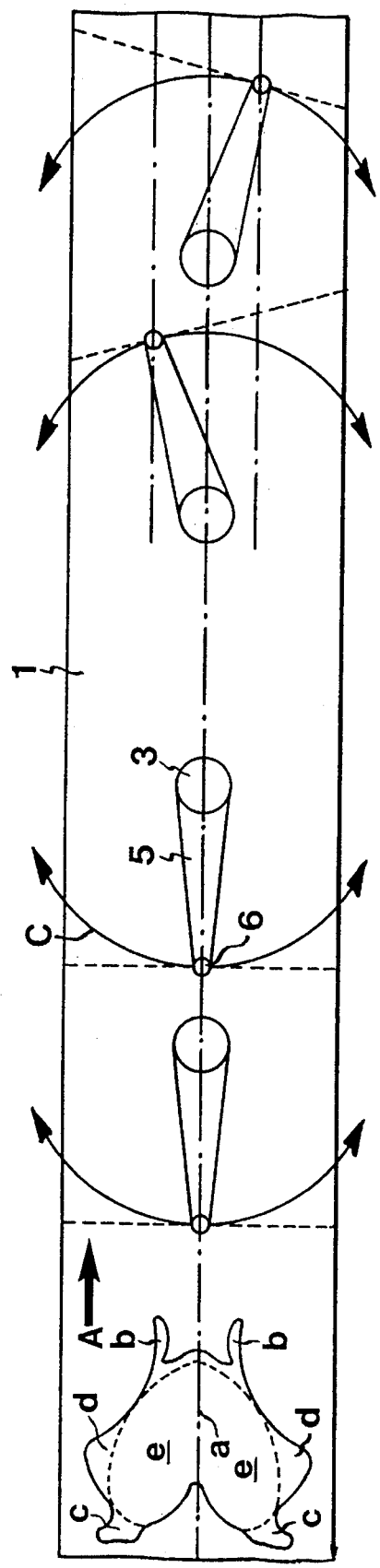

United States Patent [19]
Nielsen et al.

[11] Patent Number: 5,551,910
[45] Date of Patent: Sep. 3, 1996

[54] ARRANGEMENT AND PLANT FOR FLUID JET CUTTING OF FOOD PRODUCTS

[75] Inventors: Jens Nielsen, Bagsvaerd; Leif Dalum, Hörsholm, both of Denmark

[73] Assignee: Lumetech A/S, Denmark

[21] Appl. No.: 397,115

[22] Filed: Mar. 7, 1995

[30] Foreign Application Priority Data

Sep. 8, 1992 [SE] Sweden .................. 9202573

[51] Int. Cl.$^6$ .................................. A22C 17/00
[52] U.S. Cl. ........................... 452/149; 452/156
[58] Field of Search ..................... 452/156, 157, 452/158, 149

[56] References Cited

U.S. PATENT DOCUMENTS

| | | | |
|---|---|---|---|
| Re. 33,917 | 5/1992 | Lapeyre et al. | 452/157 |
| 4,686,877 | 8/1987 | Jaritz et al. | |
| 4,693,153 | 9/1987 | Wainwright et al. | 83/53 |
| 4,738,004 | 4/1988 | Lapeyre . | |
| 4,847,954 | 7/1989 | Lapeyre et al. | |
| 4,875,254 | 10/1989 | Rudy et al. | 452/157 |
| 4,941,379 | 7/1990 | Gasbarro | 83/409.2 |
| 4,962,568 | 10/1990 | Rudy et al. | |
| 5,162,016 | 11/1992 | Malloy | 452/157 |
| 5,192,243 | 3/1993 | Weustink | 452/157 |
| 5,258,917 | 11/1993 | Bruder | 83/939 |
| 5,324,228 | 6/1994 | Vogeley, Jr. | 452/158 |
| 5,334,084 | 8/1994 | O'Brien et al. | 452/157 |
| 5,372,540 | 12/1994 | Burch et al. | 452/156 |

*Primary Examiner*—Willis Little
*Attorney, Agent, or Firm*—Merchant, Gould, Smith, Edell, Welter & Schmidt

[57] ABSTRACT

An arrangement for fluid jet cutting, especially for food products, comprises a nozzle which is movable on a frame. The arrangement includes an angled pipe, one end of which is fixedly connected to and in fluid communication with one end of a hollow shaft of a reversible rotary motor. The other end of the hollow shaft is connected by means of a rotary coupling to a conduit for cutting fluid. The other end of the pipe is connected to the nozzle. A plant for fluid jet cutting, especially for food products comprises a belt conveyor for carrying the products, a device for analyzing quality and/or quantity characteristics of the products to be cut, and a device for controlling the operation of the fluid jet arrangement for cutting the products on the conveyor in response to commands from the analyzing device.

2 Claims, 2 Drawing Sheets

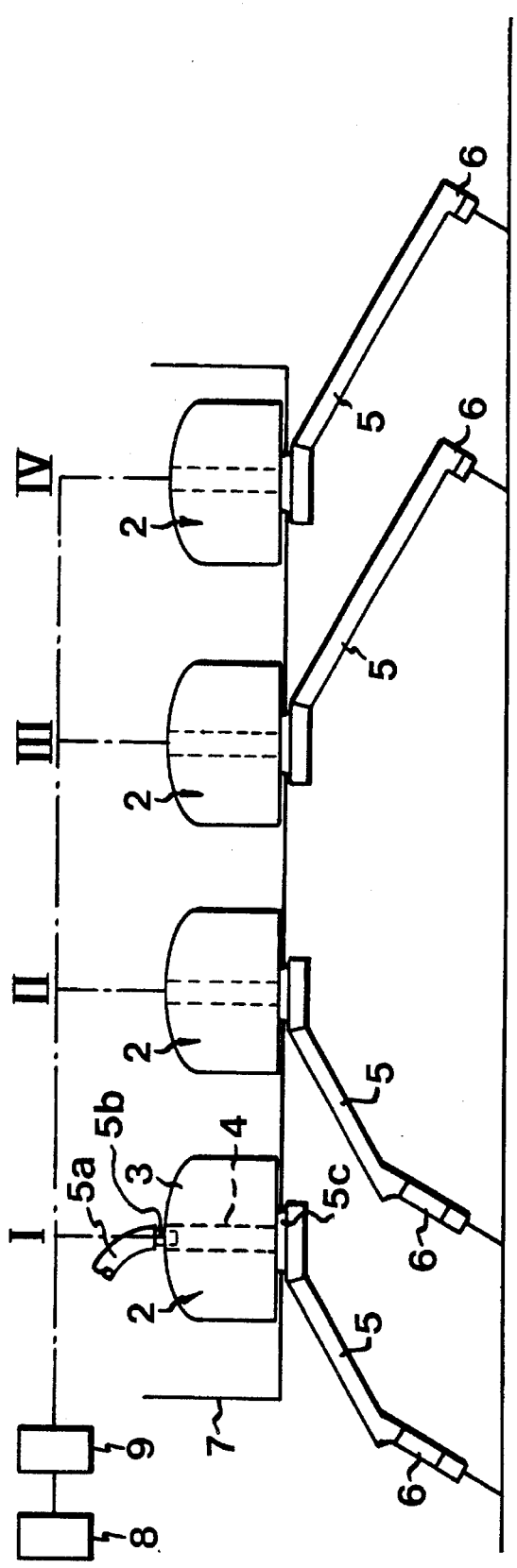
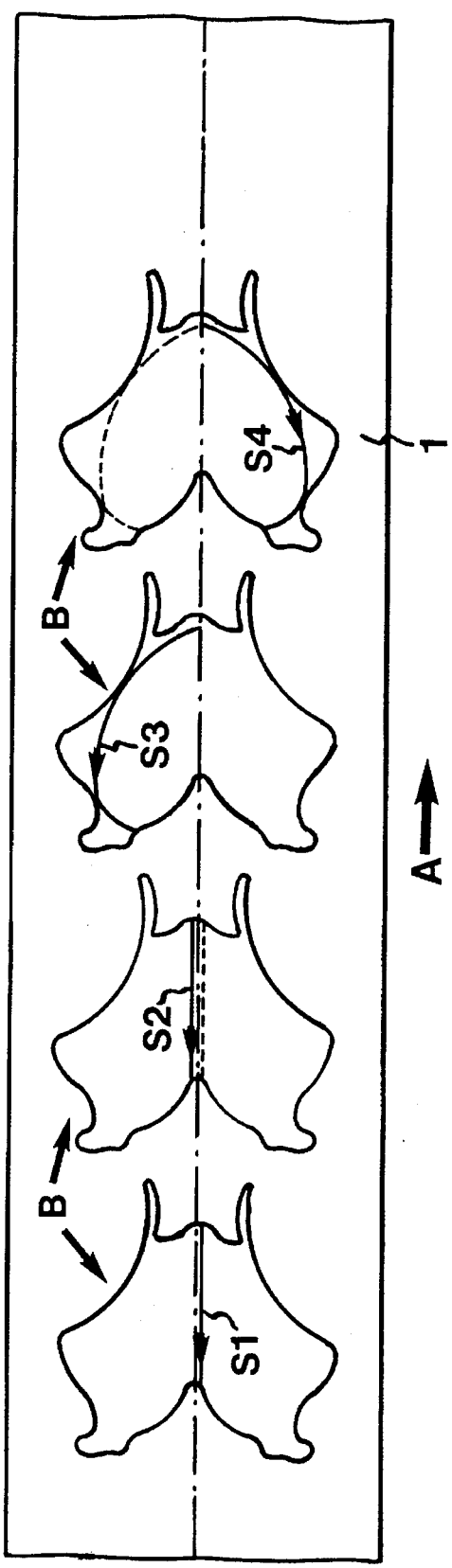

ARRANGEMENT AND PLANT FOR FLUID JET CUTTING OF FOOD PRODUCTS

The present invention relates to a plant for fluid jet cutting of food products, comprising a belt conveyor for carrying the products, at least one arrangement comprising a nozzle which is movable on a frame for producing a fluid jet, a device for analysing quality and/or quantity characteristics of the products to be cut, and a device for controlling the operation of the fluid jet arrangement for cutting the products on the conveyor in response to commands from the analysing device. The invention also relates to an arrangement for fluid jet cutting.

Such an arrangement and such a plant are disclosed in U.S. Pat. No. 4,962,568.

One drawback of this prior-art arrangement and plant is associated with the fluid jet cutting assembly. This comprises a rail which extends transverse to the direction of travel of the conveyor, being a conveyor belt, and on which runs a carriage provided with a spray nozzle. The spray nozzle projects from a slot provided in a housing for the assembly. The carriage is driven by a piston and cylinder unit. By this arrangement, the assembly will be exposed to heavy soiling, occasioned by water rebounding from the conveyor belt and entraining particles from the products that are being cut or have been cut earlier. This soiled water penetrates through the slot of the housing, which thus has to be dismounted for cleaning the assembly. Furthermore, there is a risk of leakage from the piston cylinders which may cause soiling of the food products.

U.S. Pat. No. 4,847,954 discloses a fluid jet cutting arrangement having a nozzle suspended in articulated fashion from a frame disposed beside a conveyor. The conveyor moves relative to the nozzle frame, but during the cutting of a product located on the conveyor, either the conveyor or the nozzle frame appear to be stationary.

U.S. Pat. No 5,133,687 discloses an automatic butchering system where the nozzle of the fluid jet cutting arrangement is suspended from a complex articulated-arm system.

Moreover, the known fluid jet arrangements are quite complicated.

The object of the invention is to overcome the above-mentioned problems.

This object has been achieved by means of an arrangement and a plant having the features recited in the characterising clauses of the appended claims.

Since the fluid jet arrangement is of rotational type, the housing of the arrangement can be provided with a simple lead-in opening for the spray arm, which can easily be sealed by means of a gasket. Thus, the housing need not be dismounted when the plant is to be cleaned, and the sensitive, movable components accommodated therein will remain protected and sealed in the housing during both the operating phase and the cleaning phase. The central bearing for mounting the fluid-jet conducting arm means that the number of parts of the fluid jet cutting arrangement that are located in the area of the plant exposed to cutting fluid can be minimised.

The circular-arc movement pattern for the fluid jet nozzle enables cutting the products carried on the conveyor, while this too is in motion, and producing cuts, almost perpendicular to the direction of movement of the conveyor, in the products thereon, which means an increase in production as compared with the prior art. This is achieved by the nozzle-carrying arm, during part of its pivotal motion over the conveyor belt, being capable of moving in the same direction as the conveyor.

The circular-arc motion of the nozzle also allows the creation of such cutting patterns as a translatory movement of the conveyor belt or of the nozzle transversely of the belt does not permit.

It is further evident that the invention provides an uncomplicated fluid jet cutting arrangement. It does no longer suffer from the necessity of a vast number of components, such as toothed belts, gears, piston and cylinder units with air/fluid supply hoses, lubricant, seals and joints. In the fluid jet cutting arrangement of the invention, only one arm with its nozzle need be moved. Also, these components may be very lightweight, which contributes to high acceleration ability and, hence, increased production capacity.

The rotary arrangement also means quicker acceleration of the jet nozzle to the desired cutting places and, hence, achievement of more acute corners upon directional changes in the cutting pattern, with a consequent reduction of product waste and an increased production rate.

The invention will now be described in more detail with reference to the schematic drawings, in which FIG. 1A is a side view of a plant according to the invention;

FIG. 1B shows a cutting pattern obtained with the arrangement and the plant of FIG. 1, and FIG. 2 shows the plant from above.

Over a belt conveyor 1 for carrying food products, in this case chicken breasts, there are arranged a number (in this case four) stationary water jet assemblies 2 for cutting chicken breasts B in two trimmed segments of fillets. The water jet assemblies 2 are arranged in a row vertically above the longitudinal centre line of the belt 1 (FIG. 2). They comprise a rotary motor 3 of reversible type, whose shaft 4 is fixedly connected to an arm 5, making an angle with the shaft. The shaft 4 and the arm 5 consist of pipe sections serving to supply water from a source of water to a spray nozzle 6 fixed on the free end of the arm 5. The upper end of the shaft 4 is connected to a conduit 5a from the source of water by means of a rotary coupling 5b. The lower end of the shaft 4 is supported in a liquidproof stationary housing 7 for the motor 3 by means of a ball bearing (not shown). The lead-in opening for the shaft 4 in the housing 7 is sealed by means of a gasket 5c.

The arrangement further comprises a device for determining quality/quantity parameters of the chicken breast. These parameters control the operation of the water jet assemblies 2 (the motors 3 thereof) to provide the trimmed segments or fillets, via a computer. Such a device may be of the type described in U.S. Pat. No. 4,962,568. It includes a video camera 8 positioned to "see" the food products on the conveyor belt 1, and a light source for illuminating the food products with a light line so as to produce a shadow line on the product. The video camera 8 views this shadow line and converts shadow line information into electrical signals representing the width, length and thickness dimensions of the product. The signals are processed in a computer 9 in accordance with a predetermined program, the computer controlling the operation of the water jet assemblies 2 to provide cutting motions for cutting the product into segments of desired weight/volume/profile.

Alternatively or as a complement to the above-mentioned shadow line analysis, the technique according to U.S. Pat. No. 4,631,413 (to which the applicant is a licensee) can be used for controlling the operation of the cutting jet assemblies 2 to cut the products into segments of the desired profile. This technique is based on fluorescensce analysis of food products, such as fish and meat products, for determining the content of fat, bone, cartilage and connective tissue.

The cutting pattern shown in the drawing can be achieved e.g. by means of the last-mentioned technique. The back ridge a, the fat portions b and c and the cartilage portions d have their characteristic fluorescence which therefore is usable for controlling the operation of the fluid jet cutting assemblies to cut off these portions to obtain the desired segments e.

The cutting operations may be performed as follows, reference being made to FIGS. 1 and 2. A chicken breast B transported on the conveyor belt 1 in the direction of the arrow A passes in turn through cutting stations I–IV, where the fluid jet cutting assemblies 2 are activated by the computer 9 to provide the cuts S1–S4 by the motors 3 swinging the arms 5 with the nozzles 6 transversely (arrow C) of the conveyor 1, and by varying the speed of the pivotal motion (the speed of the belt 1 is constant). Thus, the cut S1 along one side of the back ridge a is made in station I, and the cut S2 along the other side of the back ridge a is made in station II, whereupon in stations III and IV the cuts S3 and S4 separate the segments e from the breast pieces b–d.

The nozzles 6 are fixed on the respective arms 5 at a suitable angle to obtain the desired, clean cuts through the chicken breast B.

We claim:

1. An arrangement for fluid jet cutting, especially for food products, comprising:

a belt conveyor for carrying food products;

a frame;

a nozzle assembly movably attached to the frame, the nozzle assembly including an angled pipe having first and second ends, the first end being connected to a spray nozzle;

a reversible rotary motor including a hollow shaft having third and fourth ends, said third end of the shaft being fixedly connected to and in fluid communication with said second end of the pipe; and a conduit for supplying cutting fluid, the conduit being connected by means of a rotary coupling to said fourth end of the shaft.

2. A plant for fluid jet cutting, especially for food products, comprising:

(a) a belt conveyor for carrying food products;

(b) an arrangement for producing a fluid jet, the arrangement including, a frame;

a nozzle assembly movably attached to the frame, the nozzle assembly, including an angled pipe having first and second ends, the first end being connected to a spray nozzle;

a reversible rotary motor including a hollow shaft having third and fourth ends, said third end of the shaft being fixedly connected to and in fluid communication with said second end of the pipe; and a conduit for supplying cutting fluid, the conduit being connected by means of a rotary coupling to said fourth end of the shaft;

(c) a first device for analyzing quality or quantity characteristics of the food products to be cut and for producing commands based on the characteristics; and (d) a second device for controlling said arrangement responsive to the commands from said first device.

\* \* \* \* \*